Nov. 8, 1938.  H. D. GEYER  2,135,617
HYDRAULIC CLUTCH THROW-OUT
Filed July 18, 1936  2 Sheets-Sheet 2
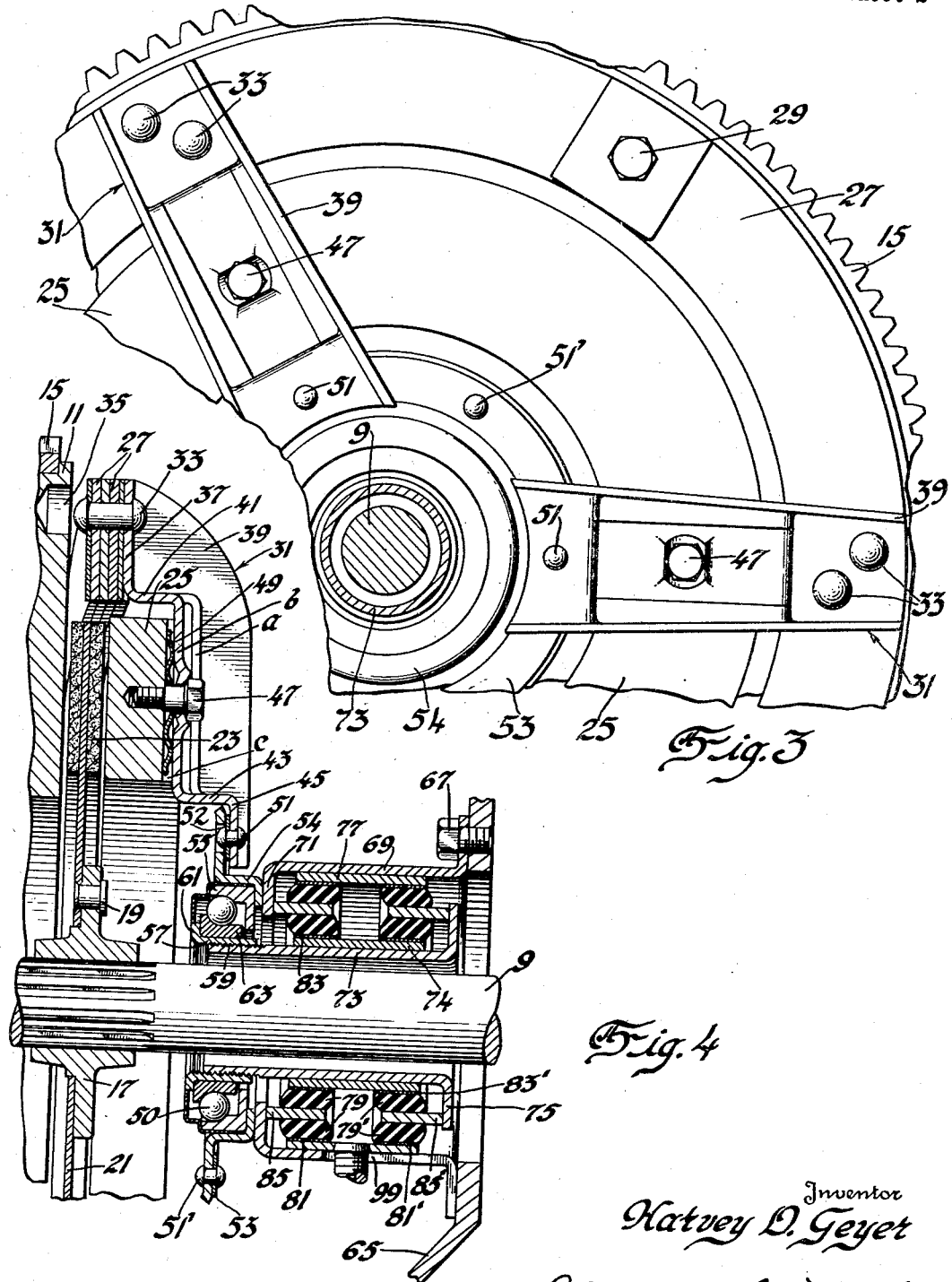
Inventor
Harvey D. Geyer
By Blackmore, Spencer & Flint
Attorneys Patented Nov. 8, 1938

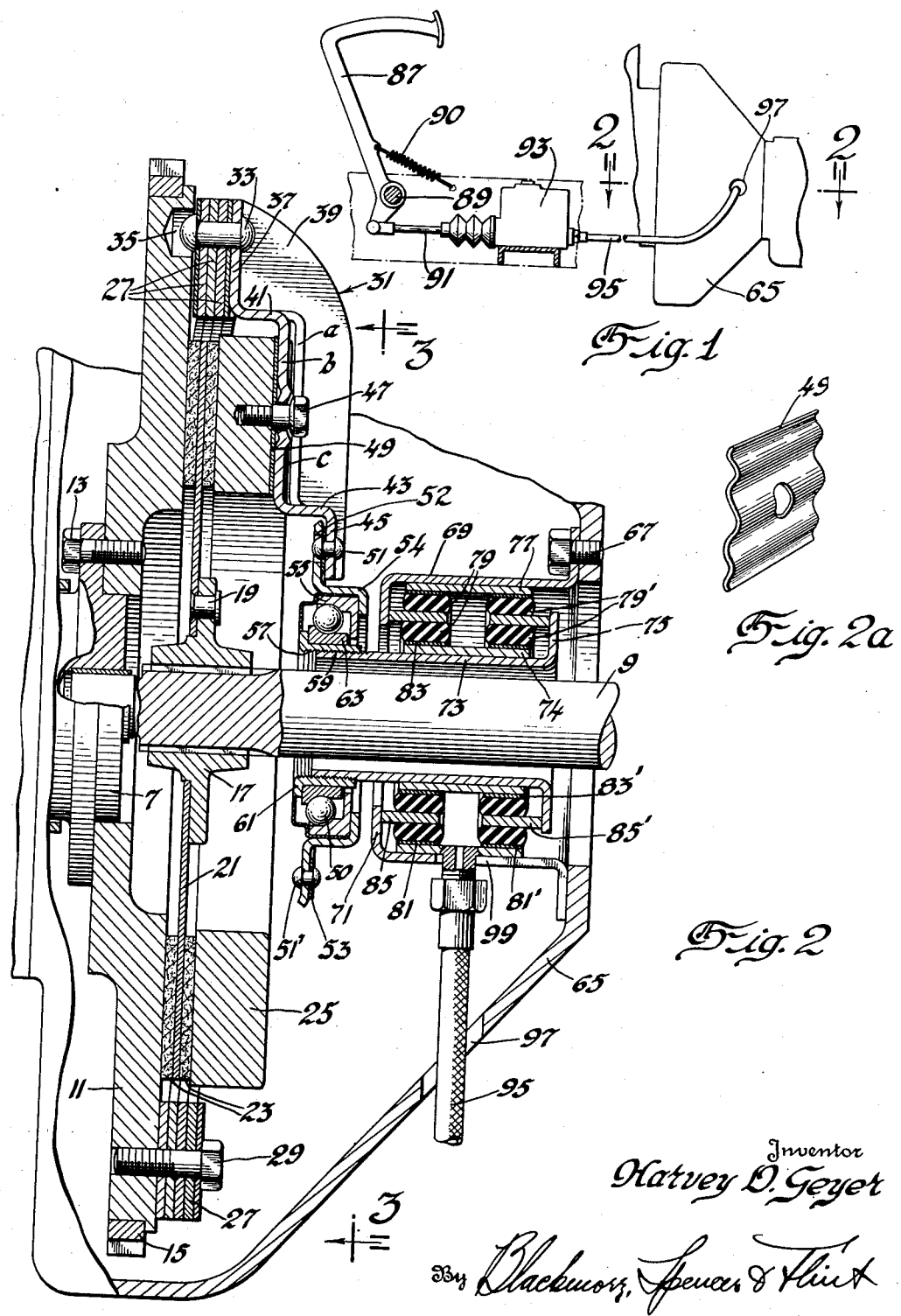

2,135,617

UNITED STATES PATENT OFFICE 2,135,617

HYDRAULIC CLUTCH THROW-OUT

Harvey D. Geyer, Dayton, Ohio, assignor to General Motors Corporation, Detroit, Mich., a corporation of Delaware Application July 18, 1936, Serial No. 91,261

6 Claims. (Cl. 60—54.6)

This invention relates to clutch releasing mechanism, particularly to mechanism operable by a moving hydraulic column to release the clutch of a motor vehicle.

A major object of the invention is to provide for clutch release by the use of a hydraulic medium.

A further object is to simplify the operation of clutch release.

Still further objects contemplate releasing mechanism which shall be easy to operate, positive in action, which shall employ a comparatively small number of parts, and be more compact than present conventional arrangements.

Still further an arrangement for clutch release in accordance with this invention is to be comparatively inexpensive and easy to install.

The invention is illustrated by the accompanying drawings in which

Fig. 1 is a side elevation.

Fig. 2 is a horizontal section on line 2—2 of Fig. 1.

Fig. 2a is a perspective of a spring.

Fig. 3 is a view showing the parts of the clutch in elevation as seen from line 3—3 of Fig. 2.

Fig. 4 is a horizontal section of the power unit shown in Fig. 2 but with parts displaced from their positions shown in Fig. 2.

Referring by reference characters to the drawings, it will be seen that the novel clutch release device is shown associated with a novel clutch arranged to couple an engine crank shaft 7 with a transmission shaft 9. There is a flywheel 11 secured at 13 to the crank shaft. The flywheel has a ring gear 15 for engagement with an engine starting pinion, not shown. The transmission or driven shaft 9 non-rotatably carries a hub 17 to which is secured at 19 a driven plate 21 provided as usual with facings 23 to engage the flywheel and the face of pressure plate 25.

Quite unconventional is the spring means by which the pressure plate is advanced to clutch engaging position. A plurality of annular springs 27 are secured to the flywheel by spaced fastening means 29. Radially extending releasing members 31 are secured at 33 to the spring assembly at points midway between adjacent spring fastening means 29. The flywheel face may be recessed at 35 to accommodate fastening means 33. The releasing members are of U shape in section, each having side flanges 39 and a web 37 to lie flat against the spring 27. The web inwardly of the end portion is bent axially at 41 to an extent sufficient to accommodate the thickness of the pressure plate. In the region extending radially across the pressure plate it is depressed as from $a$ to $b$ to seat in a radial recess $c$ of the pressure plate. The web is then carried still further axially as at 43 and terminates in a radial part 45. Bolts 47 are threaded into the pressure plate and have rounded heads to engage cooperating faces on the releasing member.

A spring plate 49 lies between the pressure plate and the overlying releasing member. It is normally bowed as shown by Fig. 2a and biases the pressure plate away from the releasing member but is flattened out when the releasing member influenced by springs 27 presses the pressure plate to clutch engaging position.

The springs 27 normally lie flat against the flywheel face. In doing so they hold the releasing member in the position shown by Fig. 2 where the pressure plate is positioned to grip the driven plate between itself and the flywheel face. If the inner end 45 of releasing member 31 is pulled axially to the right, it will overcome the action of springs 27, distort them as shown by Fig. 4 and in doing so the bolts 47 lift the pressure plate. When this occurs the clutch is released and spring 49 is restored to its bowed condition. When the clutch reengages, the spring 49 is flattened before the clutch fully engages and the spring thus affords the yielding engagement which has been found desirable in vehicle clutches.

For moving part 45 axially to accomplish the clutch release described above, the following structure is employed. At 51 there is secured to part 45 a spring ring 53 which is secured at 51' to the flanged ring 54 shaped as shown and having an angular region to engage with a press fit the outer race 55 of an antifriction bearing designated as a whole by numeral 50. A collar 57 threaded at 59 has a radial flange 61 press-fitted to the inner race 63. Secured to clutch housing 65 at 67 and located concentrically of shaft 9 is a sleeve 69. It has an inturned end 71. An opposed sleeve 73 also concentric with shaft 9 and closely adjacent thereto has one end threaded to collar 57 and an end flange 75 opposed to flange 71 of sleeve 69. Ring 77 has a sliding fit within sleeve 69 and ring 74 similarly slides around sleeve 73. Rubber rings of which four are shown and marked 79, 79' are vulcanized to outer rings 81, 81', inner rings 83, 83' and intermediate rings 85, 85' as shown. Intermediate ring 85 is in engagement with flange 71 and ring 85' with flange 75.

The rings 81, 81' are normally of too great a diameter to fit within sleeve 69 and the rings 83, 83' are normally too small in diameter to surround sleeve 74. The rings are therefore stressed to secure a press fit relative to the sleeves, the rubber being compressed and elongated in so doing.

The clutch is to be released by effecting a separation of rubber rings 79' from the rubber rings 79 under the influence of hydraulic pressure. To this end the clutch pedal 87 rotates about 89 and pushes a rod 91 which enters a combined cylinder and reservoir assembly 93 in the cylinder of which the rod moves a piston, not shown, to force a column of fluid through conduit 95 in a way which needs no further description because of the common knowledge of analogous hydraulic brake actuating devices. The conduit 95 extends through an opening 97 in the clutch housing 65 and through a slot 99 in sleeve 69 and is secured to ring 77, thus affording communication with the enclosure sealed by the rubber rings 79, 79'. When the pedal is depressed fluid under pressure enters the said enclosure. Since ring 85 contacts with 71, the latter secured to housing 65 at 67, part 71 constitutes a rigid abutment. The movement will be a movement of the ring 85'. However, owing to the fact that the rubber rings are vulcanized to the contacting metal parts; to the fact that parts 81 and 83 are press-fitted in the sleeves 77 and 74; and that these sleeves are mounted to have a slip fit relative to sleeves 69 and 73, the deformation of the rubber takes place substantially equally in the several rubber rings. When the clutch is to be reengaged, a pedal return spring 90 will rock the pedal back to its initial position and the rubber rings in returning to their former position will return the liquid from the chamber between the rings to the master cylinder in part 93.

The novel clutch is made the subject of my separate application Serial Number 93,751, for Clutch, filed August 1, 1936, and issued as Patent No. 2,089,472 on August 10, 1937.

I claim:

1. For use with a clutch having a movable releasing member, a hydraulic motor comprising an outer ring, an inner ring, axially spaced intermediate rings, deformable rings sealed to said rings to constitute an expansible chamber, anchor means for one of said intermediate rings, connecting means between the other intermediate ring and the releasing member.

2. The invention defined by claim 1 together with a fixed outer sleeve, said connecting means comprising a movable inner sleeve, said outer and inner rings having a sliding fit relative to said sleeves.

3. For use with a clutch for driving a driven shaft, said clutch including a housing and a clutch releasing member, an outer sleeve surrounding said driven shaft and adapted to be secured to said housing, a concentric inner sleeve adapted to be connected to said releasing member, a hydraulic motor to move said inner sleeve, said motor being located between said sleeves and comprising deformable means to move said inner sleeve.

4. The invention defined by claim 3, said motor further comprising outer and inner and intermediate rings, the deformable means secured to said rings, one intermediate ring engaging the outer fixed sleeve and the other intermediate ring engaging the movable inner sleeve, said outer and inner rings having a sliding fit with said sleeves.

5. A hydraulic motor for actuating a mechanism having a movable part, an outer ring and inner ring and axially spaced intermediate rings, deformable rings sealed between each of said intermediate rings and said outer and inner rings, respectively, to form a chamber therebetween, means to introduce fluid under pressure into said chamber, means to anchor one of said intermediate rings, and actuating means actuated by said other intermediate means and adapted to be connected to said movable part.

6. The invention defined by claim 5 together with a fixed outer sleeve to constitute said anchor, a concentric inner sleeve to constitute said connecting means, said outer and inner rings slidably fitting said sleeves.

HARVEY D. GEYER.